US009169087B2

(12) United States Patent
Mackenzie et al.

(10) Patent No.: US 9,169,087 B2
(45) Date of Patent: Oct. 27, 2015

(54) SYSTEM AND METHOD FOR PROPPANT TRANSFER

(75) Inventors: John Mackenzie, Aberdeen (GB); Peter Wright, Hundvag (NO); Jan Thore Eia, Kvernaland (NO)

(73) Assignee: Schlumberger Norge AS, Tananger (NO)

(*) Notice: Subject to any disclaimer, the term of this patent is extended or adjusted under 35 U.S.C. 154(b) by 1272 days.

(21) Appl. No.: 13/062,292

(22) PCT Filed: Sep. 4, 2009

(86) PCT No.: PCT/EP2009/061502
§ 371 (c)(1),
(2), (4) Date: Mar. 4, 2011

(87) PCT Pub. No.: WO2010/026235
PCT Pub. Date: Mar. 11, 2010

(65) Prior Publication Data
US 2011/0162838 A1     Jul. 7, 2011

Related U.S. Application Data

(60) Provisional application No. 61/094,825, filed on Sep. 5, 2008.

(51) Int. Cl.
*E21B 21/06* (2006.01)
*B65G 53/12* (2006.01)
*B63B 27/00* (2006.01)

(52) U.S. Cl.
CPC .............. *B65G 53/12* (2013.01); *B63B 27/20* (2013.01); *E21B 21/065* (2013.01); *E21B 21/066* (2013.01)

(58) Field of Classification Search
CPC ............................ E21B 21/065; E21B 21/066
USPC .......... 137/899.2; 175/66, 206, 207; 405/210; 414/137.5, 137.9
See application file for complete search history.

(56) References Cited

U.S. PATENT DOCUMENTS 6,230,809 B1    5/2001   Korsgaard
6,585,115 B1 *   7/2003   Reddoch et al. ................. 209/3
(Continued)

FOREIGN PATENT DOCUMENTS

EP     1 187 783     3/2002
WO     00/76889 A1     12/2000
WO     WO 2007034215 A1 *     3/2007       B65G 53/22

OTHER PUBLICATIONS

Official Action issued in corresponding Eurasian Application No. 201170417/31 with English language communication reporting the same; Dated Sep. 2, 2013 (4 pages).
Notification Concerning Transmittal of International Preliminary Report on Patentability; Dated Mar. 17, 2011 (9 pages).
(Continued)

*Primary Examiner* — Kevin Murphy

(57) ABSTRACT

A method of transferring proppant materials, wherein the method includes providing a first pressurized container (102) containing proppant materials on a first vessel (106). The method also includes connecting the first pressurized container (102) on the first vessel (106) to a second container (102) on a second vessel (114) and transferring pneumatically, proppant materials from the first pressurized container (102) on the first vessel (106) to the second container (102) on the second vessel (114). Also, a method of transferring proppant materials, the method including removing a wellbore fluid comprising excess proppant materials from a well, and screening the excess proppant materials from the wellbore fluid. The method also includes transferring the excess proppant materials to a first pressurized container (102) and transferring pneumatically, the excess proppant materials from the first pressurized container to a second pressurized container.

5 Claims, 7 Drawing Sheets

(56) References Cited

U.S. PATENT DOCUMENTS

| | | | |
|---|---|---|---|
| 7,033,124 B2 | 4/2006 | Snowdon | |
| 7,040,418 B2* | 5/2006 | Slater et al. | 175/66 |
| 2002/0108786 A1* | 8/2002 | Rowden | 175/57 |
| 2003/0164235 A1* | 9/2003 | Leeson et al. | 166/266 |
| 2004/0011562 A1* | 1/2004 | Simpson et al. | 175/66 |
| 2004/0086360 A1 | 5/2004 | Snowdon | |
| 2007/0187432 A1 | 8/2007 | Snowdon | |
| 2007/0201305 A1* | 8/2007 | Heilman et al. | 366/141 |
| 2008/0008562 A1 | 1/2008 | Beckel et al. | |

OTHER PUBLICATIONS

Official Action issued in corresponding Eurasian Application No. 201170417/31 with English report dated Jan. 29, 2013 (4 pages).
Official Action issued in corresponding Eurasian Application No. 201170417/31 with English language communication reporting the same; Dated Mar. 27, 2014 (4 pages).
International Search Report from PCT/EP2009/061502 dated Feb. 9, 2010 (2 pages).
Office Action issued in corresponding European Application No. 09782648.1 dated Sep. 21, 2012 (5 pages).

* cited by examiner

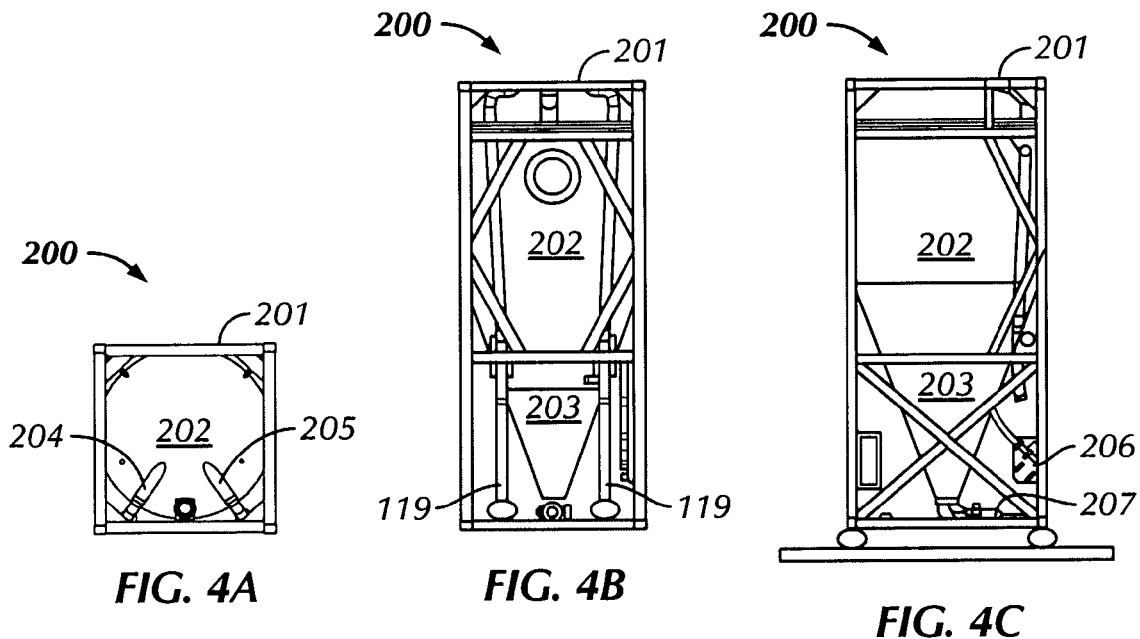
FIG. 4A
FIG. 4B
FIG. 4C
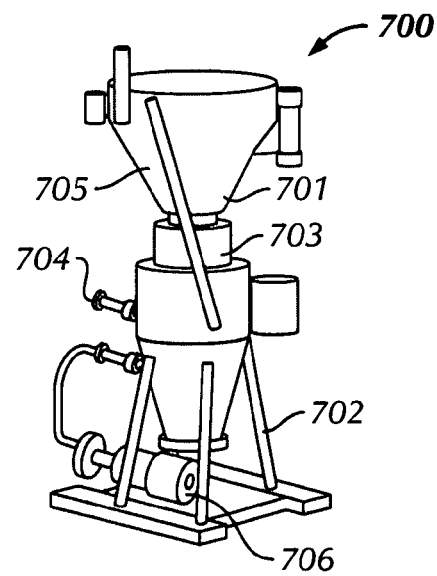
FIG. 7

SYSTEM AND METHOD FOR PROPPANT TRANSFER

BACKGROUND

1. Field of the Disclosure

Embodiments disclosed herein relate generally to methods and systems for transferring proppant materials between pressurized containers. More specifically, embodiments disclosed herein relate to methods and systems for transferring proppant materials between pressurized containers as a dense phase. More specifically still, embodiments disclosed herein relate to methods and systems for transferring proppant materials between pressurized containers disposed on supply vessels, stimulation vessels, and offshore production platforms.

2. Background Art

Traditionally, methods of transferring dry material, including proppant materials from land-based facilities to boats and then to offshore production platforms, includes lifting box or bags or bags of dry material from a first location to a second location with a crane. Depending on the volume of proppant required for a specific operation the number of crane lifts and boat trips may be substantial. For example, in a typical operation several hundred crane lifts may be required to transfer sufficient proppant from a land-based facility to a boat, for transference to an off shore platform.

In addition to requiring numerous crane lifts, procurement and then transportation of proppant to and from an offshore production platform may also be time consuming. For example, typically, a stimulation vessel that is configured to mix proppant with chemicals at a drilling location picks up proppant from a land-based facility and travels several hundred miles out to an offshore production platform. After mixing the dry proppant with chemicals on board the stimulation vessel, the constituted fluid is transferred from the stimulation vessel to the production platform. The fluid is then pumped into the wellbore using high pressure pumps on the production platform or pumped directly from a high pressure pump on the stimulation vessel. Often, the amount of proppant required is more than a single boat trip can supply, so after mixing and injecting the proppant, the stimulation vessel must travel back to the land-based facility, pick up more proppant, and then travel back to the offshore production platform. The picking up of additional proppant requires additional crane lifts, and depending on the quantity of proppant required, this process could be repeated a number of times for each well.

In addition to the time consuming nature of existing transportation mechanisms of proppant, proppant is inherently dangerous, and the transportation of proppant may increase the risks associated with the dry proppant. In an attempt to decrease the time consuming method of using multiple boat trips and crane lifts, certain operators have begun transferring dry proppant through suction. In such an application, an operator may use a vacuum to move dry proppant from a first location to a second location, thereby decreasing the need for crane lifts. However, such methods result in a high attrition rate, damage the resin coating on the proppant materials, and create more dust particles. Increased resin dust particles from the proppant may, over a certain concentration, result in an explosion, if ignited. Thus, the vacuum methods of transferring proppant may further increase the dangers of transferring proppant.

To prevent resin dust from the dry proppant from exploding, certain operators "wet" the proppant, thereby decreasing the amount of dust created during transference. While wetting the proppant causes the particles to stick together, thereby decreasing the amount of dust produced, the wetting also decreases the effectiveness of the proppant when constituted into a fluid prior to injection into the wellbore. Thus, operators are typically faced with choosing between a slow dangerous process of transferring proppant using multiple crane lifts, or decreasing the effectiveness of the end product.

Accordingly, there exists a need for systems and methods for transferring proppant between land-based facilities, vessels, and offshore production platforms.

SUMMARY OF THE DISCLOSURE

In one aspect, embodiments disclosed herein relate to a method of transferring proppant materials, the method including providing a first pressurized container containing proppant materials on a first vessel. The method also includes connecting the first pressurized container on the first vessel to a second container on a second vessel and transferring pneumatically, proppant materials from the first pressurized container on the first vessel to the second container on the second vessel.

In another aspect, embodiments disclosed herein relate to a method of transferring proppant materials, the method including removing a wellbore fluid comprising excess proppant materials from a well, and screening the excess proppant materials from the wellbore fluid. The method also includes transferring the excess proppant materials to a first pressurized container and transferring pneumatically, the excess proppant materials from the first pressurized container to a second pressurized container.

In another aspect, embodiments disclosed herein relate to a method of transferring proppant materials as a dense phase, the method including conveying pneumatically, a slug comprising proppant materials from a first pressurized container to a second pressurized container and filtering the proppant materials to remove dust from one or more of the first pressurized container and the second pressurized container.

In another aspect, embodiments disclosed herein relate to a system for transferring proppant materials, the system including a first pressurized container including proppant materials disposed on a first vessel and a second pressurized container in fluid communication with the first pressurized container disposed on a second vessel. The method further including the first pressurized container being configured to transfer the proppant materials from the first pressurized container to the second pressurized container as a dense phase.

Other aspects and advantages of the invention will be apparent from the following description and the appended claims.

BRIEF DESCRIPTION OF DRAWINGS

FIGS. 4A-4C illustrate various views of pressurized containers according to embodiments of the present disclosure.

FIG. 7 shows a side view of a pneumatic transference device according to embodiments of the present disclosure.

DETAILED DESCRIPTION

In one aspect, embodiments disclosed herein relate to methods and systems for transferring proppant materials between pressurized containers. More specifically, embodiments disclosed herein relate to methods and systems for transferring proppant materials between pressurized containers as a dense phase. More specifically still, embodiments disclosed herein relate to methods and systems for transferring proppant materials between pressurized containers disposed on supply vessels, stimulation vessels, and offshore production platforms.

Generally, proppant materials are transferred from supply vessels to stimulation vessels, where the proppant materials are mixed with water and chemicals to create fluid for injection into a wellbore. Typically, the transfer of such proppant materials may occur through the transportation of box or bags on stimulation vessels via gravity tanks and conveyor belts, where the proppant materials are mixed, and then transferred or pumped to an offshore drilling well for injection. Such operations may require the stimulation vessel to return to a land-based facility to procure additional supplies of proppant materials, as supplies run out. Each time a stimulation vessel leaves an offshore production platform to procure additional supplies, the drilling/production operation incurs additional expenses including the cost of transporting the proppant, fuel costs associated with trips to shore, and lost time, as each trip to shore and then back to the production platform may require several days.

The embodiments disclosed herein may provide methods and systems to decrease the amount of trips to shore by the stimulation vessel, thereby allowing for a proppant injection operation to progress in a more efficient manner. Additional advantages associated with the pneumatic transfer of proppant may also be realized, such as health, safety, and environmental advantages.

Figure 1:
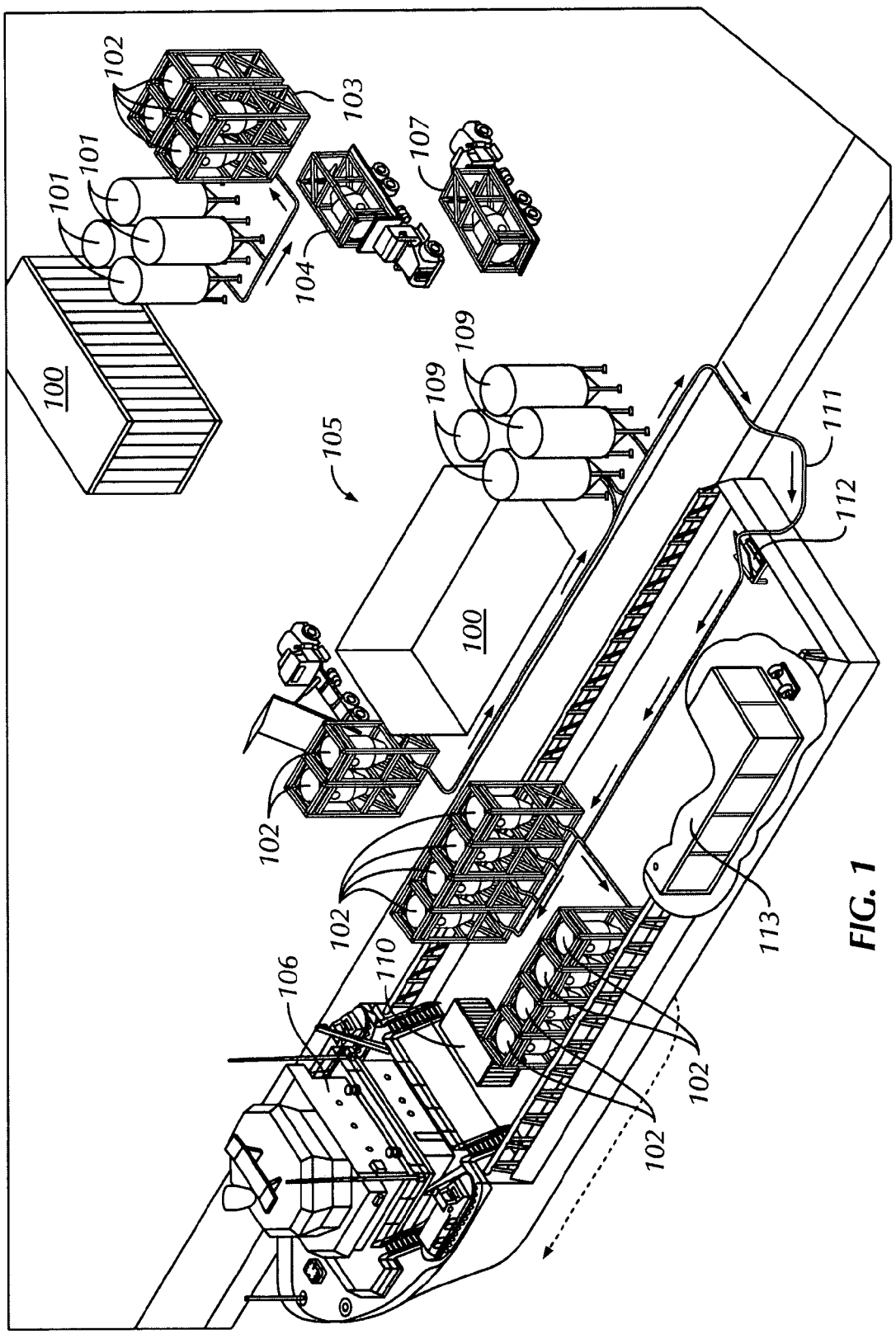
FIG. 1 is a schematic representation of proppant transfer from a land-based facility to a supply vessel according to embodiments of the present disclosure

Referring initially to FIG. 1, a schematic representation of proppant transfer from a land-based facility to a supply vessel according to embodiments of the present disclosure is shown. In this embodiment, proppant materials are originally manufactured at a plant 100. At the plant 100, proppant materials may be stored in proppant storage tanks 101 before being loaded into pressurized containers 102. Exemplary pressurized containers will be discussed in detail below, but those of ordinary skill in the art will appreciate that any type of pressurized container capable of allowing for the transport of wet or dry materials may be used. Preferably, the pressurized containers will be in a standard ISO frame 103, thereby increasing the ease of transport.

After the pressurized containers 102 are filled with proppant, the pressurized containers 102 are loaded onto trucks 104 and transported to a land-based loading facility 105. At the land-based loading facility 105, the pressurized containers 102 may be unloaded from trucks 104. As used herein, the phrase "on a supply vessel" includes pressurized containers located on the deck of a supply vessel and/or pressurized containers located below deck. Air may then be forced into pressurized containers 102, thereby allowing for the pneumatic transfer of the proppant materials from the pressurized containers 102 at the land-based loading facility 105 to the pressurized containers 102 disposed on supply vessel 106. Similarly, in certain embodiments, materials, such as excess proppant, may be transferred from pressurized containers 102 disposed on supply vessel 106 to the pressurized containers 102 located at the land-based loading facility 105. After the pressurized containers 102 located at the land-based loading facility 105 are empty, or otherwise filled with other materials, such as excess proppant, the pressurized containers 102 may be transported back to manufacturing plant 100 or to other locations via trucks 104.

In addition to the loading of proppant materials from the land-based loading facility 105 into pressurized containers 102 on supply vessel 106, dry chemicals from a chemical storage area 108 or wet chemicals and/or water from containers 109 may also be transferred onto supply vessel 106. The transfer of such additional materials may be via pneumatic transference between pressurized containers 102, or in certain embodiments, may be through conventional suction transference through the use of an air compressor 110 located on supply vessel 106. The determination of the type of transference may depend in part on the type of the materials being transferred, as well as the type of equipment available at a given facility. For example, if the facility is equipped with pressurized containers 102 capable of transferring both wet and dry materials pneumatically as a dense phase, the materials may be transferred using such containers. However, in certain embodiments, the wet and/or dry chemicals may not require the same care of handling as the proppant does. In such embodiments, traditional suction or lean phase transference may be an alternative to the dense phase transference of materials via pressurized containers 102.

Transference of materials from land-based loading facility 105 to supply vessel 106, whether using lean or dense phase transference, may occur by running a hose 111 from pressurized containers 102 located at the land-based facility 105 to the supply vessel 106. Supply vessel 106 may also include a tilt table 112 to enhance the flow of materials from the land-based facility 105 to supply vessel 106. Such tilt tables 112 may be used to connect and regulate the flow of air and/or materials through hose 111, and thereby control the flow of material between pressurized containers 102 and/or storage containers 108 and 109.

On the supply vessel 106, water may be transferred to a water storage container or vessel tank 113, while chemicals and proppant materials may be transferred to pressurized containers 102. Those of ordinary skill in the art will appreciate that in certain embodiments multiple hoses 111 may be run between land-based facility 105 and supply vessel 106, thereby increasing the speed of loading and unloading water, chemicals, and proppant material. Additionally, depending on the types of materials being transferred, individual streams of materials may be kept separate, as discrete streams, to prevent mixing and/or premature reaction. Thus, in certain aspects, both pneumatic transference of materials using pressurized containers 102 and traditional suction transference may be used to load and unload supply vessel 106.

Figure 2:
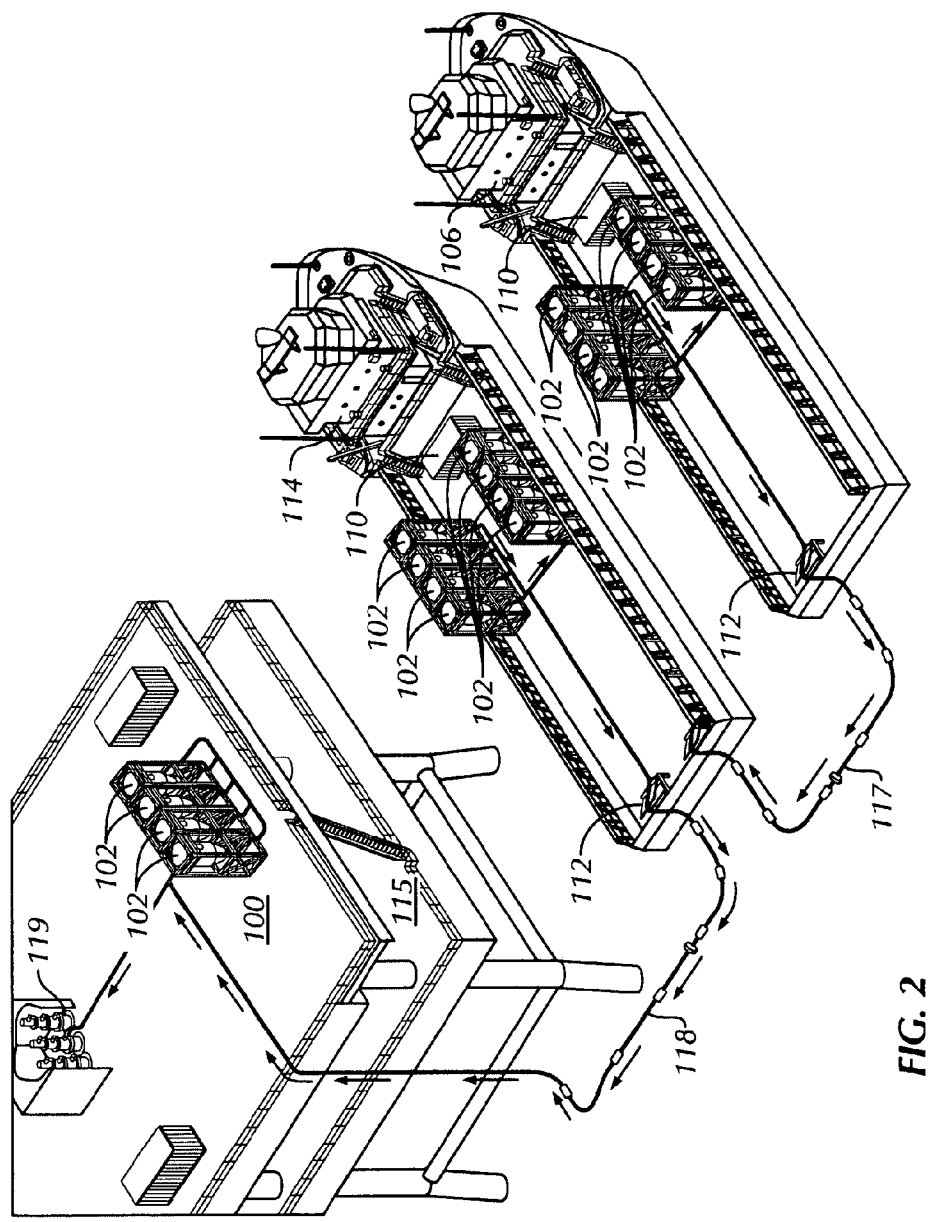
FIG. 2 is a schematic representation of proppant transfer from a supply vessel to a stimulation vessel and a production platform according to embodiments of the present disclosure.

Referring to FIG. 2, a schematic representation of proppant transfer at a production platform according to embodiments of the present disclosure is shown. In this embodiment, a supply vessel 106 including pressurized containers 102 has arrived at a production platform 115. Also at the production platform 115 is a stimulation vessel 114. Stimulation vessel 114 is a vessel that may be used to mix proppant materials with water and chemicals to produce a wellbore fluid used in production operations. Initially, a hose 117 is run between supply vessel 106 and stimulation vessel 114 to allow for the transference of proppant materials therebetween. Through actuation of a compressor 110, air is introduced into pressurized containers 102 on supply vessel 106 and the proppant material in the pressurized containers 102 is transferred from supply vessel 106 to pressurized containers 102 on stimulation vessel 114. To connect and regulate the flow of proppant between supply vessel 106 and stimulation vessel 114, one or more tilt tables 112, as described above, may be used.

After the proppant material is transferred to stimulation vessel 114, into containers located thereon, the proppant is mixed with water and/or chemicals to produce a wellbore fluid used in the production operation. While in this aspect, the containers on stimulation vessel 114 are illustrated as pressurized containers 102, those of ordinary skill in the art will appreciate that in certain embodiments, the containers may not be pressurized. Thus, supply vessel 106 may use dense phase transference to transmit dry proppant from supply vessel 106 to stimulation vessel 114, without requiring equipment upgrades on stimulation vessel 114. Accordingly, dense phase transference may be used with the existing infrastructure on stimulation vessels 114.

In other aspects, supply vessel 106 may use dense phase transference to transmit proppant materials from supply vessel 106 to pressurized containers 102 on stimulation vessel 114. After mixing the proppant material with chemicals and/or water, the wellbore fluid may be transferred from pressurized containers 102 on stimulation vessel 114 to the production platform 115. Such transference may be through actuation of a compressor 110 on stimulation vessel, and regulated by a tilt table 112, as described above.

From the stimulation vessel 114, the wellbore fluid may be transferred to a well via hose 118. At the well, pumps 119 may be used to inject the wellbore fluid into the wellbore. In other aspects, the wellbore fluid may be transferred to additional pressurized containers 102 disposed on production platform 115. Such additional pressurized containers 102 may be used to store the wellbore fluid prior to injection into the wellbore, or alternatively, may be used to control the flow of wellbore fluid prior to injection. In still other aspects, pressurized containers 102 on production platform 115 may be used to store dry proppant materials at the production site. Storing proppant materials at the production site may allow for transference between a stimulation vessel 114 or on-site mixing in later injection operations.

Figure 3:
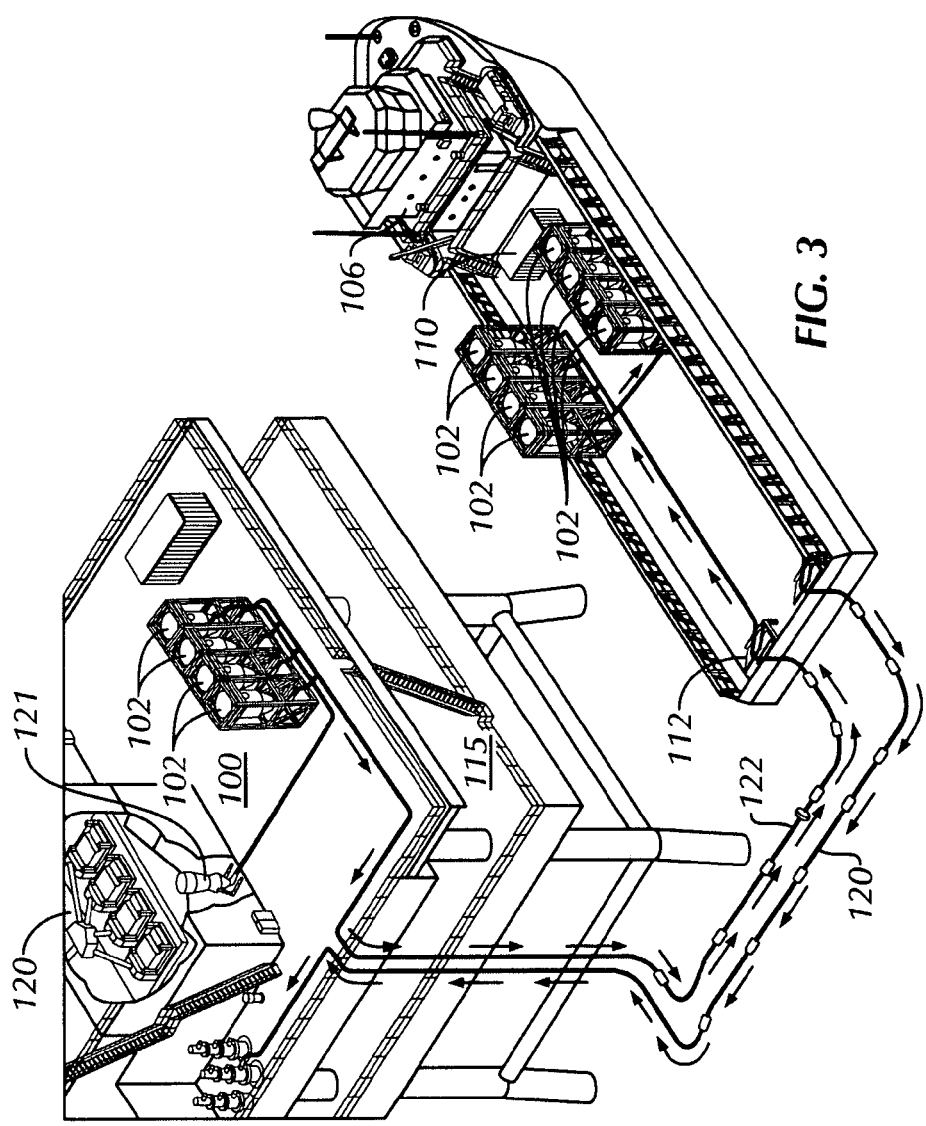
FIG. 3 is a schematic representation of proppant and excess proppant transfer between a supply vessel and an offshore production platform according to embodiments of the present disclosure.

Referring to FIG. 3, a schematic representation of proppant transfer between a supply vessel 106 and a production platform 115 according to embodiments of the present disclosure is shown. In this embodiment, supply vessel 106 is located proximate a production platform 115. As described above, in an unloading operation, proppant materials may be transferred from pressurized containers 102 on supply vessel 106 either to a pump 119 at a well head via hose 120, or to pressurized containers 102 on production platform 115 (not shown). Those of ordinary skill in the art will appreciate that in alternate embodiments, supply vessel 106 may be replaced with a stimulation vessel, as described with respect to FIG. 2, thereby allowing the transference of a wellbore fluid directly to pump 119.

After the wellbore fluid is injected into the wellbore and proppant is absorbed by the formation, excess wellbore fluid containing proppant may remain downhole. To recover the excess, unabsorbed wellbore fluid, the fluid may be returned to the production platform via coiled tubing and directed to a separatory operation. A separatory operation may include one or more vibratory separators 120 (e.g., shale shakers) that are configured to separate the proppant materials and wellbore fluid that may be reused from contaminants. After the reusable materials are recovered, the materials may be directed to a pressurized transference device 121. An example of a pressurized transference device 121 that may be used according to embodiments disclosed herein include a cuttings blower ("CCB"), such as that commercially available from M-I LLC, Houston, Tex.

As the recovered materials are transferred from vibratory separators 120 to the pressurized transference device 121, the pressurized transference device 121 may be actuated so as to transmit the recovered materials to pressurized containers 102. In one aspect, as illustrated, the pressurized transference device 121 may transfer the recovered materials to pressurized containers 102 disposed on production platform 115; however, in other aspects, pressurized transference device 121 may transfer the recovered materials directly to pressurized vessels located on a stimulation vessel 114 or a supply vessel 106. The recovered materials may thereafter be reinjected into the wellbore in subsequent operations, be reconstituted with additional chemicals and/or water, as described above, or sent back to a land-based facility for storage and/or reuse.

In this embodiment, the recovered materials are initially transferred from pressurized transference device 121 to pressurized containers 102 on production platform 115. The recovered materials are then transferred via hose 122 to pressurized containers 102 located on supply vessel 106. Those of ordinary skill in the art will appreciate that because the recovered materials may be wet, and not dry, like the proppant materials discussed above, the transference may be either lean phase or dense phase transference. Furthermore, the recovered material may be transferred through the use of compressors 110 on either supply vessel 106 or production platform 115 (not shown), and may be regulated through the use of tilt tables 112, as explained above.

According to the methods of transferring proppant materials between land-based facilities, supply vessels, stimulation vessels, and production platforms discussed above, varying changes to the process may occur due to the availability of equipment. For example, in certain aspects, pressurized containers may be filled with dry proppant materials at a manufacturing facility, then the pressurized containers may be disposed directed onto a supply vessel through crane lifts. In other aspects, the proppant materials may be stored at a land-based facility, then transferred to pressurized containers using, for example, a pressurized transference device, and then loaded onto a supply vessel via crane lifts. In either aspect, pressurized containers containing dry proppant are provided to a supply vessel.

In still other embodiments, pressurized containers having dust filters may be used to increase the safety of handling the dry proppant materials. As explained above, dry proppant materials, using traditional methods of transference, may result in the production of dust particles. The production of dust particles increases the potential of explosions. Thus, to increase the safety of handling dry proppant materials, the pressurized containers may include filtration devices, such as dust filters. Accordingly, each transference of dry proppant materials between pressurized containers having dust filters may result in the collection of dust particles, thereby increasing the safety of handling the materials.

Pressurized containers may include varying designs and configurations, so long as the pressurized containers allow for the pneumatic transference of dry materials. More specifically, the pressurized containers are configured to allow for the positive pneumatic transference of materials between a first pressurized container and a second container, whether the second container is a pressurized container or includes an atmospheric receiving chamber. Several examples of pressurized containers that may be used according to embodiments of the present disclosure are discussed in detail below.

Referring to FIGS. 4A through 4C, a pressurized container according to embodiments of the present disclosure is shown. FIG. 4A is a top view of a pressurized container, while FIGS. 4B and 4C are side views. One type of pressurized vessel that may be used according to aspects disclosed herein includes an ISO-PUMPT™, commercially available from M-I LLC, Houston, Tex. In such an embodiment, a pressurized container 200 may be enclosed within a support structure 201. Support structure 201 may hold pressurized container 200 to protect and/or allow the transfer of the container from, for example, a supply boat to a production platform. Generally, pressurized container 200 includes a vessel 202 having a lower angled section 203 to facilitate the flow of proppant materials between pressurized container 200 and other processing and/or transfer equipment (not shown). A further description of pressurized containers 200 that may be used with embodiments of the present disclosure is discussed in U.S. Pat. No. 7,033,124, assigned to the assignee of the present application, and hereby incorporated by reference herein. Those of ordinary skill in the art will appreciate that alternate geometries of pressurized containers 200, including those with lower sections that are not conical, may be used in certain embodiments of the present disclosure.

Pressurized container 200 also includes a material inlet 204 for receiving proppant material, as well as an air inlet and outlet 205 for injecting air into the vessel 202 and evacuating air to atmosphere during transference. Certain containers may have a secondary air inlet 206, allowing for the injection of small bursts of air into vessel 202 to break apart dry materials therein that may become compacted due to settling. In addition to inlets 204, 205, and 206, pressurized container 200 includes an outlet 207 through which dry proppant materials may exit vessel 202. The outlet 207 may be connected to flexible hosing, thereby allowing pressurized container 200 to transfer materials, such as dry proppant, between pressurized containers 200 or containers at atmosphere.

Figure 5A:
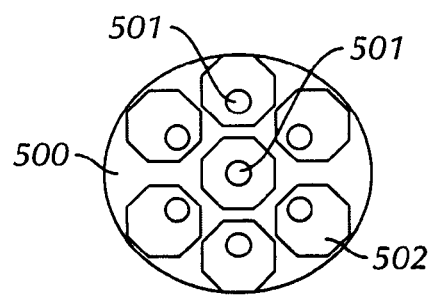
FIGS. 5A-5D illustrate various views of pressurized containers according to embodiments of the present disclosure.
Figure 5C:
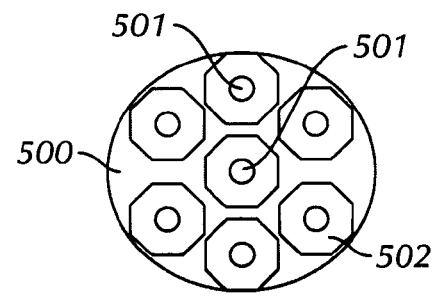
Figure 5B:
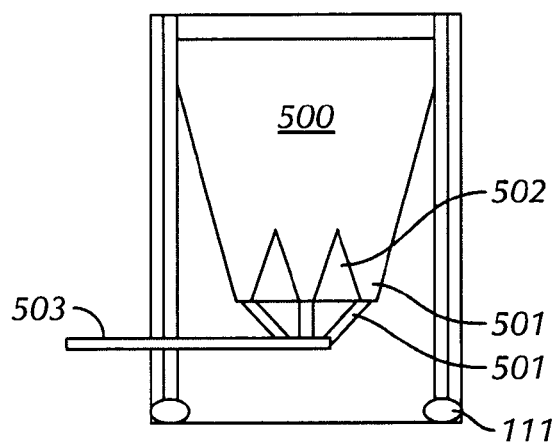
Figure 5D:
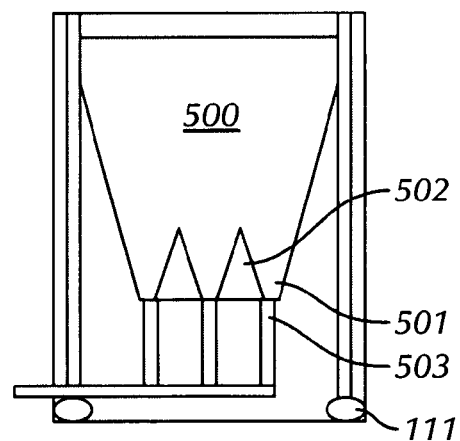

Referring to FIGS. 5A through 5D, a pressurized container 500 according to embodiments of the present disclosure is shown. FIGS. 5A and 5B show top views of the pressurized container 500, while FIGS. 5C and 5D show sides views of the pressurized container 500.

Referring now specifically to FIG. 5A, a top schematic view of a pressurized container 500 according to an aspect of the present disclosure is shown. In this embodiment, pressurized container 500 has a circular external geometry and a plurality of outlets 501 for discharging proppant material therethrough. Additionally, pressurized container 500 has a plurality of internal baffles 502 for directing a flow of proppants to a specific outlet 501. For example, as proppant materials are transferred into pressurized container 500, the materials may be divided into a plurality of discrete streams, such that a certain volume of material is discharged through each of the plurality of outlets 501. Thus, pressurized container 500 having a plurality of baffles 502, each corresponding to one of outlets 501, may increase the efficiency of discharging proppant materials from pressurized container 500.

During operation, proppant materials transferred into pressurized container 500 may exhibit plastic behavior and begin to coalesce. In traditional transfer vessels having a single outlet, the coalesced materials could block the outlet, thereby preventing the flow of materials therethrough. However, the present embodiment is configured such that even if a single outlet 501 becomes blocked by coalesced material, the flow of material out of pressurized container 500 will not be completely inhibited. Moreover, baffles 502 are configured to help prevent proppant materials from coalescing. As the materials flow down through pressurized container 500, the material will contact baffles 502, and divide into discrete streams. Thus, the baffles that divide materials into multiple discrete steams may further prevent the material from coalescing and blocking one or more of outlets 501.

Referring to FIG. 5B, a cross-sectional view of pressurized container 500 from FIG. 5A according to one aspect of the present disclosure is shown. In this aspect, pressurized container 500 is illustrated including a plurality of outlets 501 and a plurality of internal baffles 502 for directing a flow of proppant material through pressurized container 500. In this aspect, each of the outlets 501 are configured to flow into a discharge line 503. Thus, as materials flow through pressurized container 500, they may contact one or more of baffles 502, divide into discrete streams, and then exit through a specific outlet 501 corresponding to one or more of baffles 502. Such an embodiment may allow for a more efficient transfer of material through pressurized container 500.

Referring now to FIG. 5C, a top schematic view of a pressurized container 500 according to one embodiment of the present disclosure is shown. In this embodiment, pressurized container 500 has a circular external geometry and a plurality of outlets 501 for discharging proppant materials therethrough. Additionally, pressurized container 500 has a plurality of internal baffles 522 for directing a flow of material to a specific one of outlets 501. For example, as materials are transferred into pressurized container 500, the material may be divided into a plurality of discrete streams, such that a certain volume of material is discharged through each of the plurality of outlets 501. Pressurized container 500 having a plurality of baffles 502, each corresponding to one of outlets 501, may be useful in discharging proppant materials from pressurized container 500.

Referring to FIG. 5D, a cross-sectional view of pressurized container 500 from FIG. 5C according to one aspect of the present disclosure is shown. In this aspect, pressurized container 500 is illustrated including a plurality of outlets 501 and a plurality of internal baffles 502 for directing a flow of proppant materials through pressurized container 500. In this embodiment, each of the outlets 501 is configured to flow discretely into a discharge line 503. Thus, as materials flow through pressurized container 500, they may contact one or more of baffles 502, divide into discrete streams, and then exit through a specific outlet 501 corresponding to one or more of baffles 502. Such an embodiment may allow for a more efficient transfer of materials through pressurized container 500.

Because outlets 501 do not combine prior to joining with discharge line 503, the blocking of one or more of outlets 501 due to coalesced material may be further reduced. Those of ordinary skill in the art will appreciate that the specific configuration of baffles 502 and outlets 501 may vary without departing from the scope of the present disclosure. For example, in one embodiment, a pressurized container 500 having two outlets 501 and a single baffle 502 may be used, whereas in other embodiments a pressurized container 500 having three or more outlets 501 and baffles 502 may be used. Additionally, the number of baffles 502 and/or discrete stream created within pressurized container 500 may be different from the number of outlets 501. For example, in one aspect, pressurized container 500 may include three baffles 502 corresponding to two outlets 501. In other embodiments, the number of outlets 501 may be greater than the number of baffles 502.

Moreover, those of ordinary skill in the art will appreciate that the geometry of baffles 502 may vary according to the design requirements of a given pressurized container 500. In one aspect, baffles 502 may be configured in a triangular geometry, while in other embodiments, baffles 502 may be substantially cylindrical, conical, frustoconical, pyramidal, polygonal, or of irregular geometry. Furthermore, the arrangement of baffles 502 in pressurized container 500 may also vary. For example, baffles 502 may be arranged concentrically around a center point of the pressurized container 500, or may be arbitrarily disposed within pressurized container 500. Moreover, in certain embodiments, the disposition of baffles 502 may be in a honeycomb arrangement, to further enhance the flow of materials therethrough.

Those of ordinary skill in the art will appreciate that the precise configuration of baffles 502 within pressurized container 500 may vary according to the requirements of a transfer operation. As the geometry of baffles 502 is varied, the geometry of outlets 501 corresponding to baffles 502 may also be varied. For example, as illustrated in FIGS. 5A-5D, outlets 501 have a generally conical geometry. In other embodiments, outlets 501 may have frustoconical, polygonal, cylindrical, or other geometry that allows outlet 501 to correspond to a flow of proppant material in pressurized container 502.

Figure 6A:
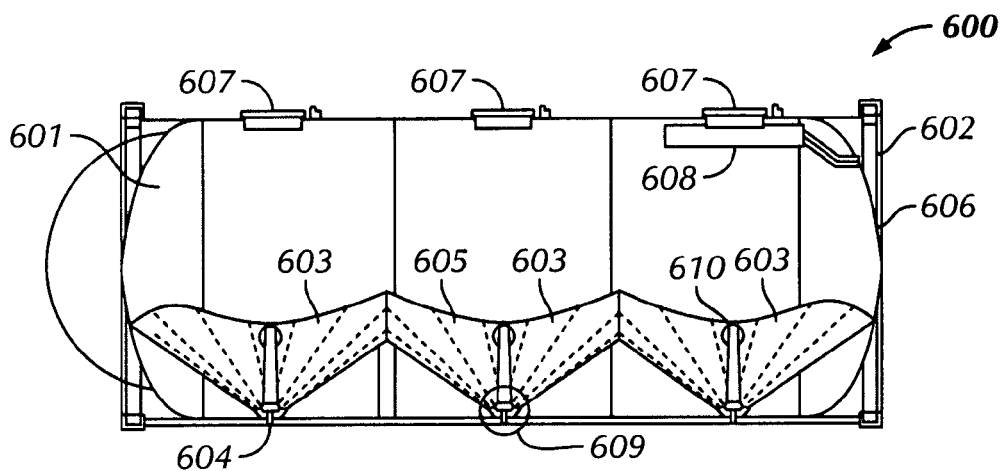
FIGS. 6A-6B illustrate various views of pressurized containers according to embodiments of the present disclosure.
Figure 6B:
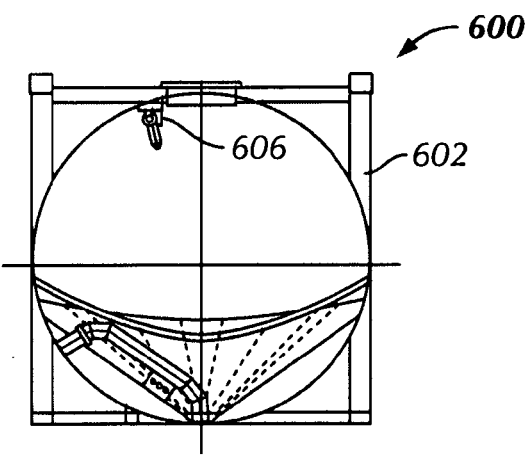

Referring now to FIGS. 6A through 6B, alternate pressurized containers according to aspects of the present disclosure are shown. Specifically, FIG. 6A illustrates a side view of a pressurized container, while FIG. 6B shows an end view of a pressurized container.

In this aspect, pressurized container 600 includes a vessel 601 disposed within a support structure 602. The vessel 601 includes a plurality of conical sections 603, which end in a flat apex 604, thereby forming a plurality of exit hopper portions 605. Pressurized container 600 also includes an air inlet 606 configured to receive a flow of air and material inlets 607 configured to receive a flow of materials, such as dry proppant. During the transference of materials to and/or from pressurized container 600, air is injected into air inlet 606, and passes through a filtering element 608. Filtering element 608 allows for air to be cleaned, thereby removing dust particles and impurities from the airflow prior to contact with the material within the vessel 601. A valve 609 at apex 604 may then be opened, thereby allowing for a flow of materials from vessel 601 through outlet 610. Examples of horizontally disposed pressurized containers 600 are described in detail in U.S. Patent Publication No. 2007/0187432 to Brian Snowdon, and is hereby incorporated by reference.

Referring now to FIG. 7, a pressurized transference device, according to embodiments of the present disclosure, is shown. Pressurized transference device 700 may include a feed chute 701 through which proppant materials may be gravity fed. After the proppant materials have been loaded into the body 702 of the device, an inlet valve 703 is closed, thereby creating a pressure-tight seal around the inlet. Once sealed, the body is pressurized, and compressed air may be injected through air inlet 704, such that the dry material in body 702 is discharged from the pressurized transference device in a batch. In certain aspects, pressurized transference device 700 may also include secondary air inlet 705 and/or vibration devices (not shown) disposed in communication with feed chute 701 to facilitate the transfer of material through the feed chute 701 by breaking up coalesced materials.

During operation, the pressurized transference device 700 may be fluidly connected to pressurized containers, such as those described above, thereby allowing proppant materials to be transferred therebetween. Because the materials are transferred in batch mode, the materials travel in slugs, or batches of material, through a hose connected to an outlet 706 of the pressurized transference device. Such a method of transference is a form of dense phase transfer, whereby materials travel in slugs, rather than flow freely through hoses, as occurs with traditional, lean phase material transfer.

Figure 8:
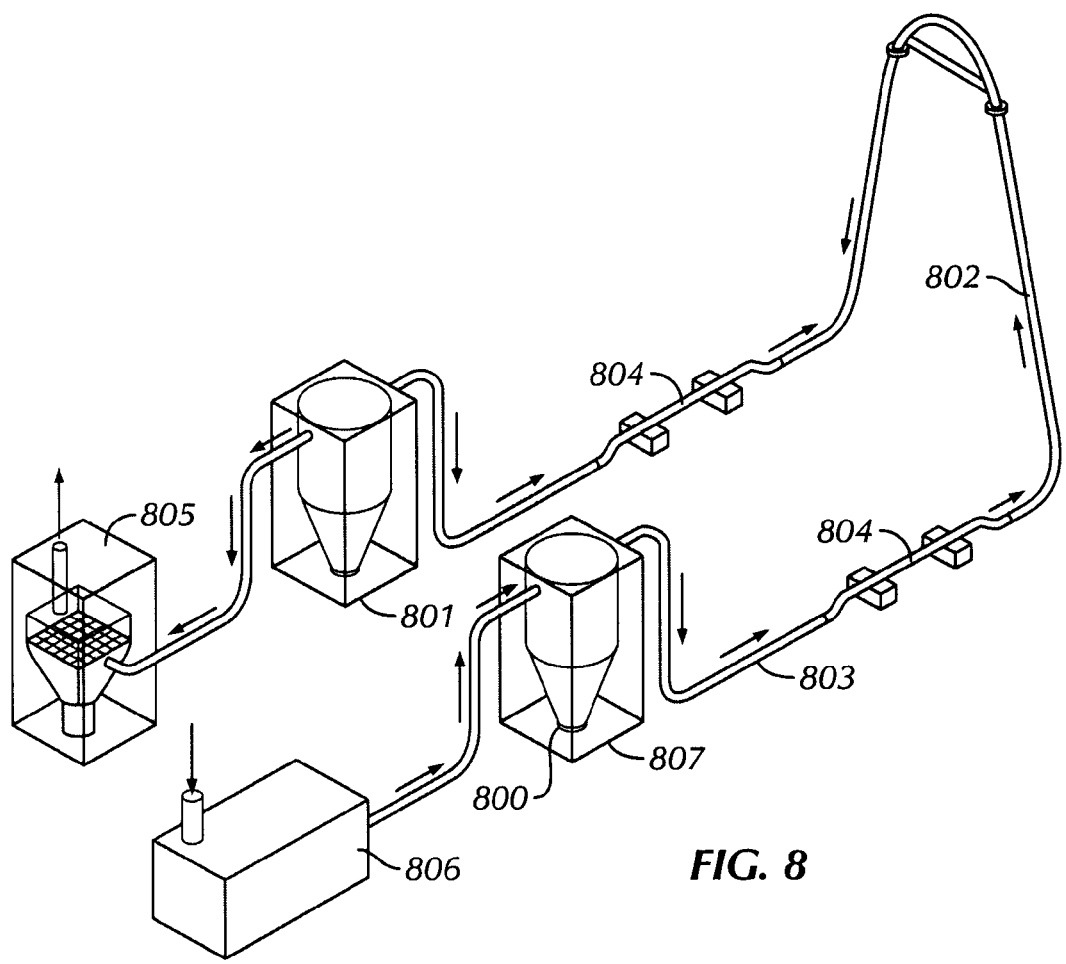
FIG. 8 shows a schematic representation of proppant transfer between pressurized containers according to embodiments of the present disclosure.

Referring to FIG. 8, a schematic representation of pressurized vessels during material transfer is shown. In this aspect, a first pressurized container 800, such as one of the pressurized containers discussed above, is in fluid communication with a second pressurized container 801 via a flow line 802. Flow line 802 may include multiple segments, including flexible hose segments 803, as well as rigid piping 804. Such flow line 802 segments may be used to control the flow of material through the line, thereby facilitating the transfer of material. In one aspect, one segment of flow line 802 is suspended from a crane. However, the vertical lift used in this aspect may not be necessary in all aspects, as the requirement of a particular transference may vary.

Pressurized container 800 also includes a compressor 806 to introduce pressurized air to the container 800, so as to pressure the proppant material out of the bottom of the container through outlet 807. In a receiving end of pressurized container 801, a filter 805 is disposed and configured to collect dust particles that may aerate during material transference. In certain aspects, as material, such as dry proppant, is transferred from pressurized container 800 to pressurized container 802, a portion of the material may aerate into a dust. As the material enters pressurized container 801, the dust particles may be collected in dust filter 805, thereby preventing the dust particles from either being vented to atmosphere from the pressurized container 801, from concentrating and creating potential explosive conditions inside pressurized container 801, or from otherwise resettling and coalescing with the material within the container. Thus, through transference of the material through the pressurized system, dust that would otherwise remain within the system may be removed, increasing the safety of handling the material.

In certain embodiments, multiple transference operations may be used including multiple pressurized vessels having dust filters to increase the safety of handling the material. For example, in one aspect, proppant may be transferred from a land-based facility to a pressurized container on a supply vessel, thereby removing dust particles from the material. Subsequently, proppant may be transferred from the pressurized container on the supply vessel to a pressurized vessel having a dust filter on a stimulation vessel, thereby further removing dust from the material. Thus, multiple dust collection steps may occur, to further remove dust particles from the material. In certain aspects, intermediate transference of proppant may also occur, such as transferring proppant to a third, fourth, or fifth pressurized container having a dust filter, to further remove dust particles from the material. Such dust collection steps may occur on vessels, such as supply and/or stimulation vessels, at production platforms, or on land-based facilities.

Advantageously, embodiments of the present disclosure may allow for the transference of proppant between land-based facilities and supply vessels in a more efficient manner. In such embodiments, the pneumatic transfer of proppant using pressurized containers prevents potential hazards from the use of cranes and boxes or bags of proppant. Because boxes or bags of proppant may result in personnel being caught between the boxes or bags, boxes or bags falling during crane lifts, trip hazards from having the boxes or bags on supply vessels, and crane lift errors, embodiments disclosed herein my provide a safer method of transferring proppant than is typically used. Additionally, the use of pneumatic transference may decrease the number of crane lifts necessary to transfer proppant from a land-based facility to a supply boat. Even if pressurized containers are lifted onto a supply boat from a land-based facility, the number of crane lifts will be less than transferring a number of box or bags of proppant equaling the same volume. Thus, using pressurized containers in the transport of proppant from land-based facilities to vessel, between multiple vessels, and between vessels and a production platform is both safer and more efficient.

Additionally, by providing methods of transferring proppant between a supply vessel and a stimulation vessel, the methods disclosed herein allow for the stimulation vessel to remain located at an offshore production platform rather than return to a land-based facility when more proppant is required. Traditionally, the stimulation vessel would have to return to pick up additional supplies of proppant when the supplies at the platform ran out. However, embodiments of the present disclosure may allow a supply vessel to pneumatically transfer proppant from a supply boat to a stimulation vessel, so the supply vessel can make multiple trips to a land-based facility to get additional proppant, while the stimulation vessel remains at the production platform. Because the stimulation vessel remains at the production platform, the amount of time it takes to mix and inject an appropriate volume of proppant into a wellbore may be decreased, thereby decreasing costs associated with the operation. Furthermore, because the stimulation vessel is not making multiple trips, costs may be saved by decreasing the number of crane lifts required as well as saving costs typically associated with the fuel used to transport the stimulation vessel between the platform and the land-based facility.

Methods and systems described herein may also advantageously allow for the safer handling of proppant. Typically, by using suction to transport proppant, the suction results in a higher attrition rate, and increased dust particle generation, thereby increasing the likelihood for a container to explode. Because the pressurized containers disclosed herein may include dust filters that collect dust during the transfer of the proppant, the risk of explosion due to dust generation is decreased. Moreover, by decreasing the amount of dust particles, the effectiveness of the proppant when reconstituted may be increased. Because dust in dry proppant may decrease the effectiveness of the proppant, several transference operations may be performed to decrease the dust particles, thereby increasing the safety of the proppant while also increasing the effectiveness of the proppant.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A method of transferring proppant materials, the method comprising:
   removing a wellbore fluid comprising excess proppant materials from a well;
   screening the excess proppant materials from the wellbore fluid;
   transferring the excess proppant materials to a first pressurized container on a production platform;
   transferring pneumatically, the excess proppant materials from the first pressurized container to a second pressurized container on a first boat;
   providing a third pressurized container on a second boat and containing proppant materials;
   connecting the third pressurized container to the second pressurized container; and
   transferring pneumatically proppant materials from the third pressurized container to the second pressurized container; and
   transferring proppant materials from a land-based facility to the third pressurized container.

2. The method of claim 1, further comprising mixing the excess proppant materials into a second wellbore fluid on the first boat.

3. The method of claim 1, further comprising transferring proppant materials from the second pressurized container to the first pressurized container.

4. The method of claim 1, further comprising collecting dust particles from the first pressurized container during the transferring of the excess proppant materials.

5. The method of claim 3, further comprising collecting dust particles from the second pressurized container during the transferring of the proppant materials.

* * * * *